(12) United States Patent
Bogorad

(10) Patent No.: US 9,076,004 B1
(45) Date of Patent: Jul. 7, 2015

(54) SYSTEMS AND METHODS FOR SECURE HYBRID THIRD-PARTY DATA STORAGE

(71) Applicant: Symantec Corporation, Mountain View, CA (US)

(72) Inventor: Walter Bogorad, Danville, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/271,967

(22) Filed: May 7, 2014

(51) Int. Cl.
*G06F 9/00* (2006.01)
*G06F 21/60* (2013.01)
*H04L 29/06* (2006.01)

(52) U.S. Cl.
CPC .......... *G06F 21/602* (2013.01); *H04L 63/0281* (2013.01); *H04L 63/08* (2013.01); *H04L 63/0428* (2013.01)

(58) Field of Classification Search
CPC .. H04L 63/0281; H04L 63/0428; H04L 63/08
USPC .......... 726/2, 12; 380/259, 277, 282
See application file for complete search history.

(56) References Cited

U.S. PATENT DOCUMENTS

| | | | |
|---|---|---|---|
| 6,947,556 B1 | 9/2005 | Matyas, Jr. et al. | |
| 7,487,219 B1 | 2/2009 | Jia et al. | |
| 7,505,978 B2 | 3/2009 | Bodin et al. | |
| 7,949,681 B2 | 5/2011 | Bodin et al. | |
| 8,090,102 B2 | 1/2012 | Kitaya et al. | |
| 8,458,494 B1 | 6/2013 | Bogorad | |
| 8,495,392 B1 * | 7/2013 | Bardale | 713/193 |
| 2001/0029581 A1 | 10/2001 | Knauft | |
| 2003/0163705 A1 | 8/2003 | Richards, Jr. et al. | |
| 2003/0174841 A1 * | 9/2003 | Nault et al. | 380/277 |
| 2005/0157880 A1 | 7/2005 | Kurn et al. | |
| 2009/0313353 A1 * | 12/2009 | Lou | 709/219 |
| 2010/0172504 A1 | 7/2010 | Allen et al. | |
| 2010/0217987 A1 | 8/2010 | Shevade | |
| 2010/0257351 A1 | 10/2010 | O'Connor et al. | |
| 2010/0306176 A1 * | 12/2010 | Johnson et al. | 707/664 |
| 2011/0022642 A1 * | 1/2011 | deMilo et al. | 707/805 |

(Continued)

OTHER PUBLICATIONS

Mulazzani, Martin et al., "Dark Clouds on the Horizon: Using Cloud Storage as Attack Vector and Online Slack Space", http://publik.tuwien.ac.at/files/PubDat_202722.pdf, as accessed on Mar. 2, 2012, SBA Research, (Sep. 18, 2011).

(Continued)

*Primary Examiner* — Michael Chao
*Assistant Examiner* — Peiliang Pan
(74) *Attorney, Agent, or Firm* — ALG Intellectual Property, LLC

(57) ABSTRACT

The disclosed computer-implemented method for secure hybrid third-party data storage may include (1) identifying, at a trusted proxy system, an access request from a client system to access an encrypted file stored under a user account at a third-party storage system, where the requested access requires decryption of the encrypted file, (2) retrieving, from the third-party storage system, (i) the encrypted file and (ii) a decryption key that has been encrypted with a client-side key, where an asymmetric key pair designated for the user account includes an encryption key and the encrypted decryption key, (3) receiving, at the trusted proxy system, the client-side key, (4) decrypting, at the trusted proxy system, the decryption key with the client-side key, and (5) using the decryption key to access an unencrypted version of the encrypted file at the trusted proxy system. Various other methods, systems, and computer-readable media are also disclosed.

20 Claims, 7 Drawing Sheets

(56) References Cited

U.S. PATENT DOCUMENTS

| | | | |
|---|---|---|---|
| 2011/0258333 A1 | 10/2011 | Pomerantz et al. | |
| 2012/0328105 A1 | 12/2012 | Mukkara et al. | |
| 2013/0111217 A1* | 5/2013 | Kopasz et al. | 713/189 |

OTHER PUBLICATIONS

Amazon, "Amazon Simple Storage Service (Amazon S3)", http://aws.amazon.com/s3/, as accessed on Mar. 2, 2012, (Jul. 2006).

Box.Net, Inc., "Comprehensive Security at all Levels", http://www.box.net/static/download/Security_Overview_2-1.pdf, as accessed on Mar. 2, 2012, (Mar. 2009).

Perez, Sarah "Finally! Bitcasa CEO Explains How the Encryption Works", http://techcrunch.com/2011/09/18/bitcasa-explains-encryption/, as accessed on Mar. 2, 2012, (Sep. 18, 2011).

Storer, Mark W., et al., "Secure Data Deduplication", http://www.ssrc.ucsc.edu/Papers/storer-storagess08.pdf, as accessed Mar. 2, 2012; Fairfax, VA, USA, StorageSS' 08, (Oct. 31, 2008).

Trimbak Bardale; Systems and Methods for Securely Deduplicating Data Owned by Multiple Entities; U.S. Appl. No. 12/874,640, filed Sep. 2, 2012.

Walter Bogorad; Systems and Methods for Secure Third-Party Data Storage; U.S. Appl. No. 13/787,757, filed Mar. 6, 2013.

Walter Bogorad; Systems and Methods for Secure Third-Party Data Storage; U.S. Appl. No. 13/800,305, filed Mar. 13, 2013.

Paul Agbabian; Systems and Methods for Providing Access to Data Accounts Within User Profiles Via Cloud-Based Storage Services; U.S. Appl. No. 13/742,217, filed Jan. 15, 2013.

Yu, Shucheng et al., "Achieving Secure, Scalable, and Fine-grained Data Access Control in Cloud Computing", Infocom, 2010 Proceedings IEEE, IEEE, Piscataway, NJ, USA, (Mar. 14, 2010).

Tsai, Wei-Tek et al., "Role-Based Access-Control Using Reference Ontology in Clouds", Autonomous Decetralized Systems (ISADS), 2011 10th International Symposium on, IEEE, (Mar. 23, 2011).

"Private Cloud for Your Enterprise—Installable Cloud Storage Solution for Security & Control", http://www.gladinet.com/CloudEnterprise/, as accessed Apr. 16, 2014, Gladinet, Inc., (2008).

"Syncplicity by EMC", http://www.syncplicity.com/solutions/, as accessed Apr. 16, 2014, Syncplicity LLC, (2007).

"Hybrid Deployment Architecture", http://www.ctera.com/products/technology/hybrid-deployment-architecture, as accessed Apr. 16, 2014, CTERA Networks Ltd., (Oct. 19, 2012).

Banerji, Preeta et al., "Deploying an Enterprise-Ready Content Sync-and-Share Solution", http://www.intel.com/content/dam/www/public/us/en/documents/white-papers/deploying-an-enterprise-ready-content-sync-and-share-solution.pdf, as accessed Apr. 16, 2014, IT@Intel White Paper, Intel Corporation, (Sep. 2013).

"Newest ownCloud Enterprise File Sync and Share Keeps IT in Control of Corporate Data", https://owncloud.com/blog/newest-owncloud-enterprise-file-sync-share-keeps-control-corporate-data, as accessed Apr. 16, 2014, ownCloud Inc., Lexington, MA, (Mar. 11, 2014).

"Kiteworks for Enterprise It—Cloud Deployment Options", http://www.accellion.com/solutions/enterprise-it-and-security/cloud-deployment-options, as accessed Apr. 16, 2014, Accellion, (Oct. 1, 2013).

* cited by examiner

SYSTEMS AND METHODS FOR SECURE HYBRID THIRD-PARTY DATA STORAGE

BACKGROUND

Organizations and consumers increasingly use third-party services to store data. Third-party storage services may provide a number of benefits to customers, including flexibility, low capitalization requirements, add-on services, data sharing, and centralized access to data.

Many third-party storage customers want or need to encrypt their data before submitting the same to a third-party storage vendor. For example, individual consumers may wish to encrypt data sent to third-party storage vendors due to privacy concerns. Similarly, organizations may wish to encrypt data sent to third-party storage vendors in order to ensure compliance with internal or external data-protection requirements, such as governmental laws and regulations, partnership agreements with other organizations, etc. Unfortunately, by encrypting data before submitting the same to a third-party storage system, customers may interfere with a third-party storage vendor's attempt to deduplicate the data. For example, if two customers encrypt identical files using different encryption schemes (e.g., different keys), the resulting encrypted files will differ, potentially preventing the third-party storage vendor from deduplicating the files into a single file that is referenced multiple times. Additionally, encrypting files before submitting the files to a third-party storage system may interfere with the ability of a third-party storage service to efficiently share the files with other users where directed and/or to perform other services on the files, such as running security scans on the files, generating custom views of the files, etc.

In view of the above limitations, the instant disclosure identifies a need for additional and improved systems and methods for secure third-party data storage.

SUMMARY

The instant disclosure describes various systems and methods for secure hybrid third-party data storage. As will be described in greater detail below, by maintaining asymmetric key pairs for encrypting and decrypting secured data (e.g., files and/or encryption keys for files) on a third-party storage server and encrypting the decryption keys of these asymmetric key pairs with encryption keys maintained by clients, the systems and methods described herein may allow a trusted proxy system to the third-party storage server to encrypt data submitted by clients to the third-party storage server as needed but require clients to submit a decryption key in order to access secured data.

In one example, a computer-implemented method for secure hybrid third-party data storage may include (1) identifying, at a trusted proxy system, an access request from a client system to access an encrypted file stored under a user account at a third-party storage system, where the requested access requires decryption of the encrypted file, (2) retrieving, in response to the request, from the third-party storage system and for the trusted proxy system, (i) the encrypted file and (ii) a decryption key that has been encrypted with a client-side key, where an asymmetric key pair designated for the user account may include an encryption key and the encrypted decryption key, (3) receiving, at the trusted proxy system, the client-side key, (4) decrypting, at the trusted proxy system, the decryption key with the client-side key, and (5) using the decryption key to access an unencrypted version of the encrypted file at the trusted proxy system.

In one embodiment, the trusted proxy system may be owned by an owner of the encrypted file and the third-party storage system may not be owned by the owner of the encrypted file. In some examples, accessing the encrypted file may include transmitting the unencrypted version of the encrypted file to the client system. Additionally or alternatively, using the decryption key to access the unencrypted version of the encrypted file may include (1) generating, at the trusted proxy system, metadata describing the unencrypted version of the encrypted file and (2) providing the metadata to at least one of the client system and the third-party storage system.

In some examples, generating the metadata describing the unencrypted version of the encrypted file may include (1) performing a scan on the unencrypted version of the encrypted file at the trusted proxy system, (2) creating, at the trusted proxy system, an index entry of the unencrypted version of the encrypted file based on content within the unencrypted version of the encrypted file, and/or (3) generating, at the trusted proxy system, a preview of the unencrypted version of the encrypted file based on content within the unencrypted version of the encrypted file.

In some examples, accessing the encrypted file may include (1) identifying, at the trusted proxy system, a policy for scanning the unencrypted version of the encrypted file and (2) scanning, at the trusted proxy system, the unencrypted version of the encrypted file based on the policy.

In some examples, using the decryption key to access the encrypted file may include (1) retrieving, from the third-party storage system and for the trusted proxy system, a file key used to encrypt the encrypted file, where the file key is encrypted with the encryption key, (2) decrypting, at the trusted proxy system, the file key with the decryption key, and (3) decrypting, at the trusted proxy system, the encrypted file with the file key.

In one embodiment, (1) accessing the encrypted file may include providing access to the unencrypted version of the encrypted file to an additional user account and (2) an additional asymmetric key pair may be designated for the additional user account, where the asymmetric key pair includes an additional encryption key and an additional decryption key that has been encrypted with an additional client-side key.

In some examples, providing access to the unencrypted version of the encrypted file to the additional user account may include (1) retrieving, from the third-party storage system and for the trusted proxy system, the additional encryption key and a file key used to encrypt the encrypted file, where the file key is encrypted with the encryption key, (2) decrypting, at the trusted proxy system, the file key with the decryption key, (3) encrypting, at the trusted proxy system, a copy of the file key with the additional encryption key, and (4) transmitting the encrypted copy of the file key from the trusted proxy system to the third-party storage system.

In one embodiment, the computer-implemented method may further include (1) receiving, at the trusted proxy system, the unencrypted version of the encrypted file from the client system, (2) generating the encrypted file at the trusted proxy system by (i) generating a file key based on at least one characteristic of the unencrypted version of the encrypted file, (ii) encrypting the unencrypted version of the encrypted file with the file key, (iii) encrypting the file key with the encryption key, and (iv) transmitting the encrypted file and the encrypted file key to the third-party storage system.

In some examples, the computer-implemented method may further include deduplicating the encrypted file with an additional encrypted file that is encrypted with the file key. In one embodiment, the third-party storage system may lack access to (1) the unencrypted version of the encrypted file, (2) an unencrypted version of the decryption key, and (3) the client-side key.

In some examples, using the decryption key to access the unencrypted version of the encrypted file may include (1) retrieving, from the third-party storage system and for the trusted proxy system, an additional asymmetric key pair designated for a plurality of user accounts including the user account, the additional asymmetric key pair including an additional encryption key and an additional decryption key that has been encrypted with the encryption key, (2) decrypting, at the trusted proxy system, the additional decryption key with the decryption key, (3) retrieving, from the third-party storage system and for the trusted proxy system, a file key used to encrypt the encrypted file, where the file key is encrypted with the additional encryption key, (4) decrypting, at the trusted proxy system, the file key with the additional decryption key, and (5) decrypting, at the trusted proxy system, the encrypted file with the file key.

In one embodiment, a system for implementing the above-described method may include (1) an identification module, stored in memory, that identifies, at a trusted proxy system, an access request from a client system to access an encrypted file stored under a user account at a third-party storage system, where the requested access requires decryption of the encrypted file, (2) a retrieving module, stored in memory, that retrieves, in response to the request, from the third-party storage system and for the trusted proxy system, (i) the encrypted file and (ii) a decryption key that has been encrypted with a client-side key, where an asymmetric key pair designated for the user account may include an encryption key and the encrypted decryption key, (3) a receiving module, stored in memory, that receives, at the trusted proxy system, the client-side key, (4) a decryption module, stored in memory, that decrypts, at the trusted proxy system, the decryption key with the client-side key, (5) a using module, stored in memory, that uses the decryption key to access an unencrypted version of the encrypted file at the trusted proxy system, and (6) at least one physical processor configured to execute the identification module, the retrieving module, the receiving module, the decryption module, and the using module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, at a trusted proxy system, an access request from a client system to access an encrypted file stored under a user account at a third-party storage system, where the requested access requires decryption of the encrypted file, (2) retrieve, in response to the request, from the third-party storage system and for the trusted proxy system, (i) the encrypted file and (ii) a decryption key that has been encrypted with a client-side key, where an asymmetric key pair designated for the user account may include an encryption key and the encrypted decryption key, (3) receive, at the trusted proxy system, the client-side key, (4) decrypt, at the trusted proxy system, the decryption key with the client-side key, and (5) use the decryption key to access an unencrypted version of the encrypted file at the trusted proxy system. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
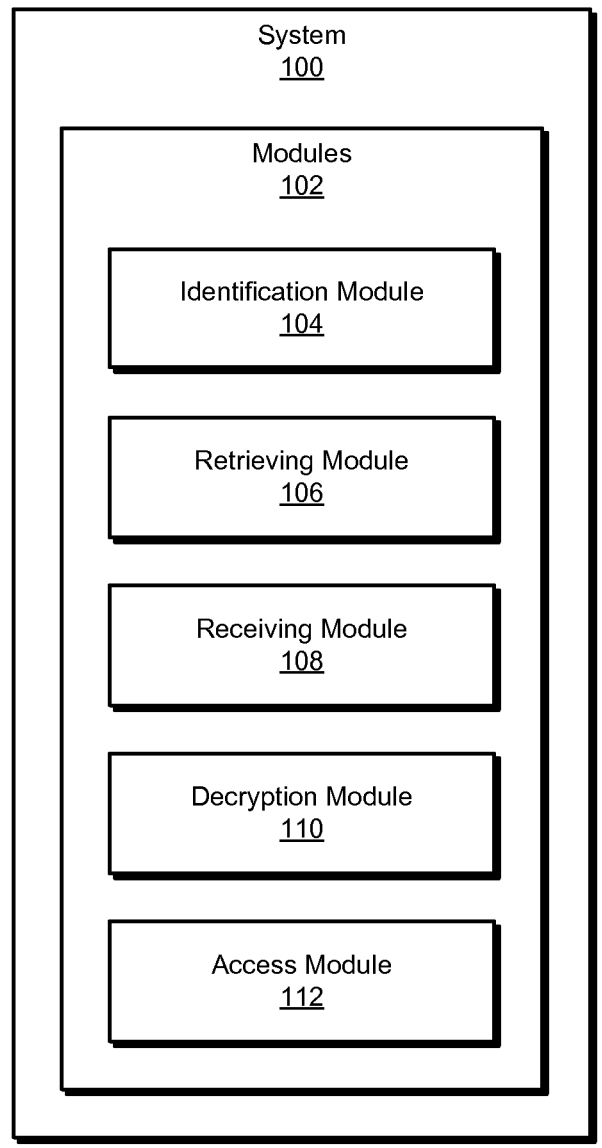
FIG. 1 is a block diagram of an exemplary system for secure hybrid third-party data storage.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for secure hybrid third-party data storage. As will be described in greater detail below, by maintaining asymmetric key pairs for encrypting and decrypting secured data (e.g., files and/or encryption keys for files) on a third-party storage server and encrypting the decryption keys of these asymmetric key pairs with encryption keys maintained by clients, the systems and methods described herein may allow a trusted proxy system to the third-party storage server to encrypt data submitted by clients to the third-party storage server as needed but require clients to submit a decryption key in order to access secured data. These systems and methods may thereby prevent an attacker who has gained access to a third-party storage system from accessing the secured data in an unencrypted state (or, e.g., a key that may be used to access the secured data in an unencrypted state), while still allowing and/or facilitating the sharing, deduplication, analysis, and/or indexing of this secured data. In some examples, these systems and methods may also enable enterprises to apply scanning policies to the secured data without revealing the potentially sensitive contents of the scanning policies to the third-party storage server.

The following will provide, with reference to FIGS. 1-2, 4, and 5, detailed descriptions of exemplary systems for secure hybrid third-party data storage. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for secure hybrid third-party data storage. As illustrated in this figure, exemplary system 100 may include one or more modules 102 for performing one or more tasks. For example, and as will be explained in greater detail below, exemplary system 100 may also include an identification module 104 that may identify, at a trusted proxy system, an access request from a client system to access an encrypted file stored under a user account at a third-party storage system, where the requested access requires decryption of the encrypted file. Exemplary system 100 may additionally include a retrieving module 106 that may retrieve, in response to the request, from the third-party storage system and for the trusted proxy system, (i) the encrypted file and (ii) a decryption key that has been encrypted with a client-side key, where an asymmetric key pair designated for the user account may include an encryption key and the encrypted decryption key. Exemplary system 100 may also include a receiving module 108 that may receive, at the trusted proxy system, the client-side key. Exemplary system 100 may additionally include a decryption module 110 that may decrypt, at the trusted proxy system, the decryption key with the client-side key. Exemplary system 100 may also include a using module 112 that may use the decryption key to access an unencrypted version of the encrypted file at the trusted proxy system.

Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, client system 206, and/or third-party storage system 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
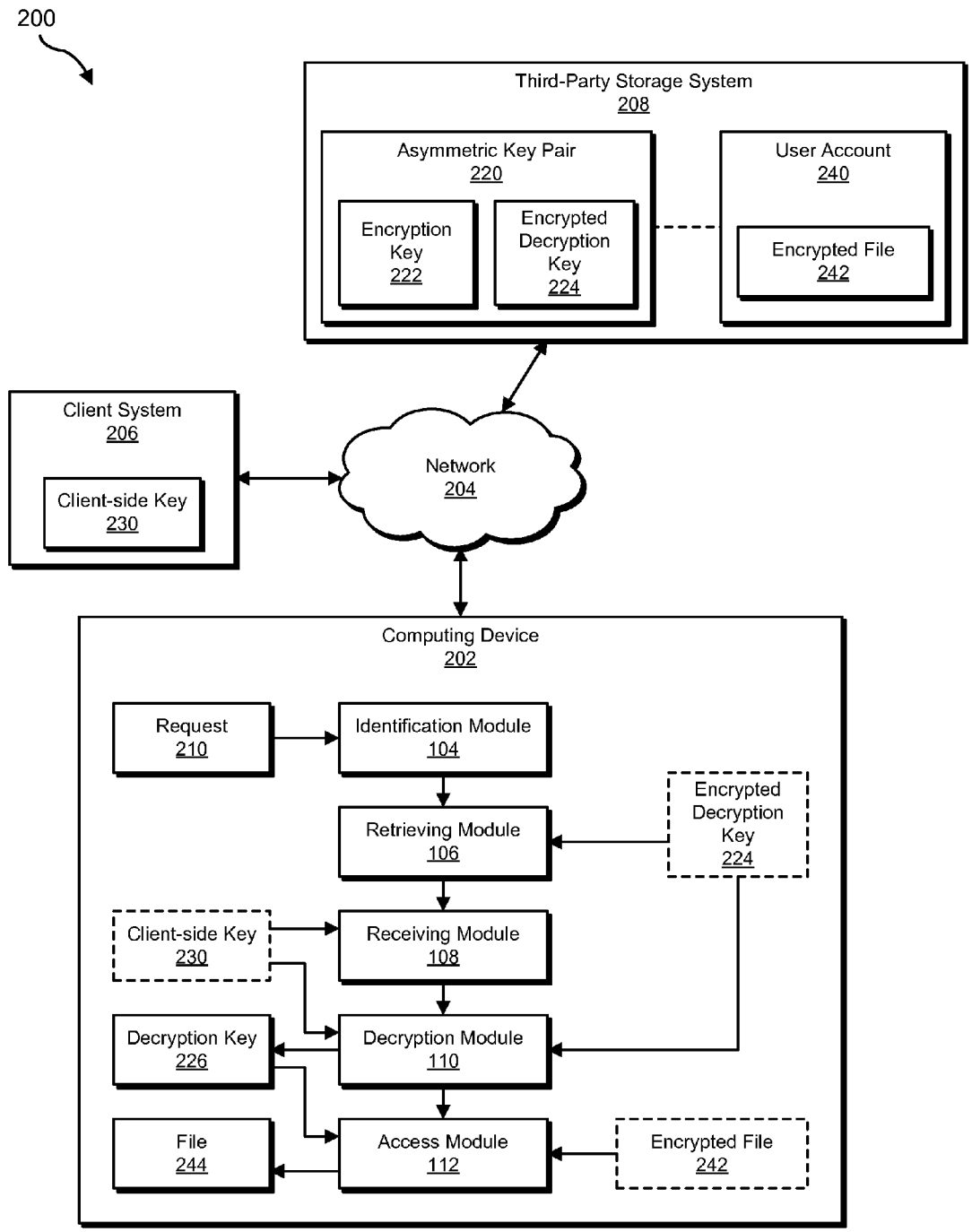
FIG. 2 is a block diagram of an additional exemplary system for secure hybrid third-party data storage.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a client system 206 and a third-party storage system 208 via a network 204. In one example, computing device 202 may be programmed with one or more of modules 102. Additionally or alternatively, client system 206 and/or third-party storage system 208 may be programmed with one or more of modules 102.

In one embodiment, one or more of modules 102 from FIG. 1 may, when executed by at least one processor of computing device 202, client system 206, and/or third-party storage system 208, enable computing device 202, client system 206, and/or third-party storage system 208 to provide secure hybrid third-party data storage (e.g., to enable client system 206 to access secure data stored on third-party storage system 208 without exposing the secure data to third-party storage system 208). For example, and as will be described in greater detail below, identification module 104 may identify, at computing device 202, an access request 210 from client system 206 to access an encrypted file 242 stored under a user account 240 at a third-party storage system 208. In this example, the requested access may require decryption of encrypted file 242. Retrieving module 106 may then retrieve, in response to request 210, from third-party storage system 208 and for computing device 202, (i) encrypted file 242 and (ii) a decryption key 226 that has been encrypted with a client-side key 230. In this example, an asymmetric key pair 220 designated for user account 240 may include an encryption key 222 and encrypted decryption key 224. Receiving module 108 may then receive, at computing device 202, client-side key 230. Decryption module 110 may then decrypt, at computing device 202, decryption key 226 with client-side key 230. Using module 112 may then use decryption key 226 to access an unencrypted version of encrypted file 242 (e.g., a file 244) at computing device 202.

Computing device 202 and client system 206 generally represent any type or form of computing device capable of reading computer-executable instructions. Examples of computing device 202 and client system 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Third-party storage system 208 generally represents any type or form of computing system that is capable of storing, receiving, managing, and/or transmitting data. Examples of third-party storage system 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Storage Area Network (SAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202, client system 206, and third-party storage system 208.

Figure 3:
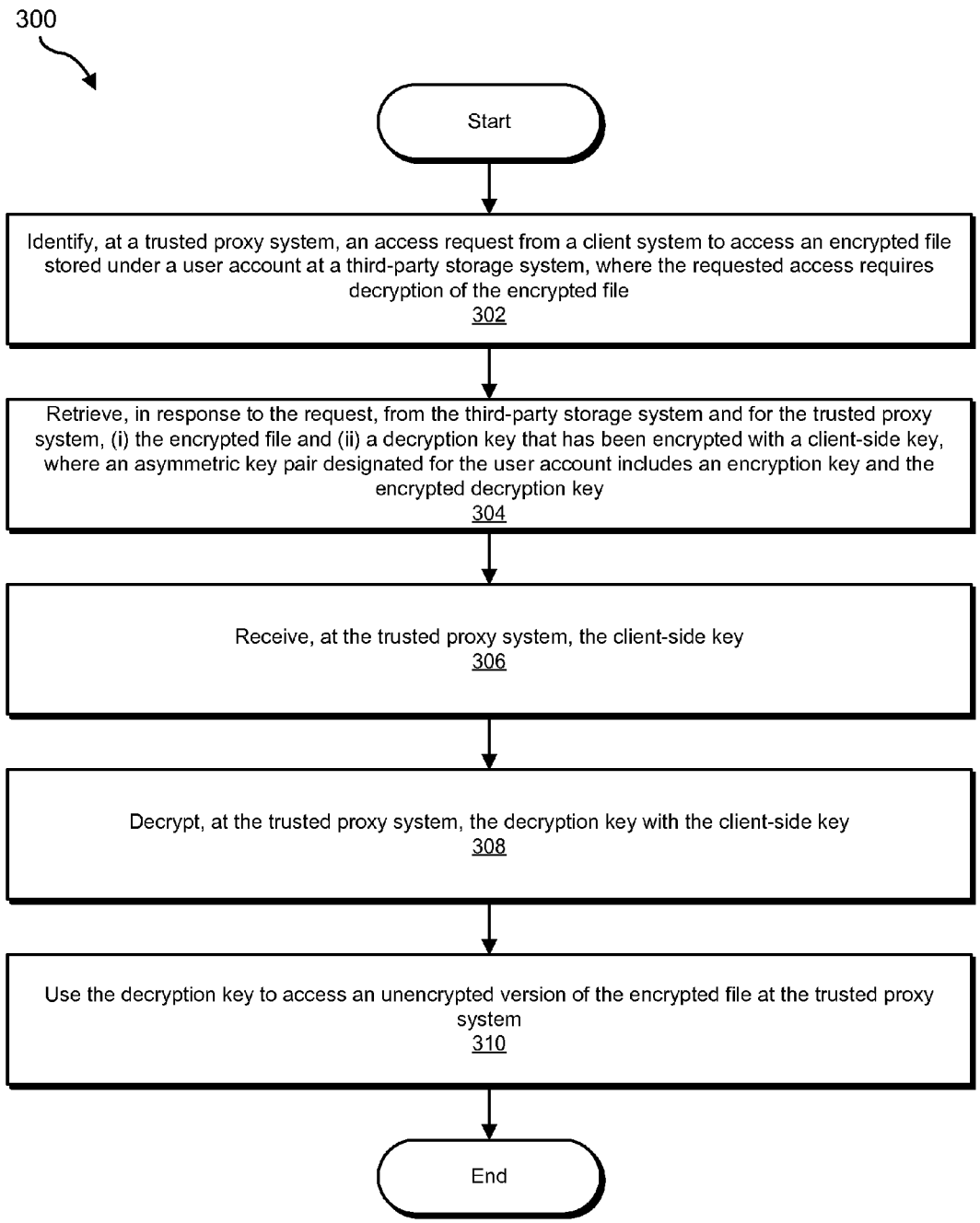
FIG. 3 is a flow diagram of an exemplary method for secure hybrid third-party data storage.

FIG. 3 is a flow diagram of an exemplary computer-implemented method 300 for secure hybrid third-party data storage. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify, at a trusted proxy system, an access request from a client system to access an encrypted file stored under a user account at a third-party storage system, where the requested access requires decryption of the encrypted file. For example, at step 302 identification module 104 may, as part of computing device 202 in FIG. 2, identify, at a computing device 202, an access request from client system 206 to access encrypted file 242 stored under user account 240 at third-party storage system 208. In this example, the requested access may require decryption of encrypted file 242.

As used herein, the phrase "third-party storage system" may refer to any type or form of storage system, including a cloud-based storage system, that is capable of storing data on behalf of a user. In some examples, the third-party storage system may store data for multiple distinct entities. In at least one example, the entities that store data with the third-party storage system may require data security against each other (in order to, e.g., prevent unprivileged access of data across entities), against intruders (e.g., entities not authorized to access data stored within the third-party storage system), and/or one or more administrators of the third-party storage system. In some examples, the third-party storage system may represent or include a single-instance storage system (i.e., a storage system configured to only store a single instance of each item of content for multiple owners).

Accordingly, the client system may, in turn, include any system for facilitating the use of a third-party storage system. In some examples, the client system may be owned and/or administrated by an entity distinct from an owner and/or administrator of the third-party storage system. In some examples, the trusted proxy system may also be owned and/or administrated by an entity distinct from an owner and/or administrator of the third-party storage system. For example, the trusted proxy system may be owned and/or administrated by an owner and/or administrator of the encrypted file. In one example, the trusted proxy system may be owned by an organization and the encrypted file may be owned and/or managed by the organization. In this example, the client system may be owned and/or administrated by the organization. Additionally or alternatively, the client system may be owned and/or administrated by a member of the organization and/or an entity who is granted access to the encrypted file by the organization (e.g., an employee of the organization). In some examples, the entity that owns and/or administrates the proxy system may delegate rights to access the encrypted file to the entity that controls the client device. Additionally or alternatively, the entity that owns and/or administrates the proxy system may securely store the encrypted file at the third-party storage system on behalf of the entity that controls the client device. Generally, the trusted proxy system may include any system that is more trusted to handle unencrypted data than the third-party storage system (e.g., due to the ownership status, management status, security status, and/or location of the trusted proxy system and/or the third-party storage system). For example, the trusted proxy system may include an on-premises system (e.g., rather than a cloud service).

As used herein, the term "file" may refer to any suitable unit of data, including, without limitation, a file, data object, data segment, portion of a data stream, database, database entry, and/or electronic document. In addition, the phrase "user account" may refer to any identifier and/or privilege system that may correspond to a data owner (used, e.g., to identify data owned by the data owner and/or to secure data owned by the data owner for use by the data owner).

Identification module 104 may identify any of a variety of types of requests. For example, as will be explained in greater detail below, identification module 104 may identify a request to retrieve an unencrypted version of the encrypted file for the client system. Additionally or alternatively, identification module 104 may identify a request to share an accessible version of the file with another user account. In some examples, identification module 104 may identify a request to perform one or more procedures on the file (e.g., procedures that require access to an unencrypted version of the encrypted file).

Identification module 104 may receive the request in any of a variety of contexts. For example, identification module 104 may receive a user-initiated request from the client system. Additionally or alternatively, and as will be explained in greater detail below, identification module 104 may receive an implicit request to access the encrypted file simply by receiving a client-side key from the client system that enables access to the encrypted file.

Figure 4:
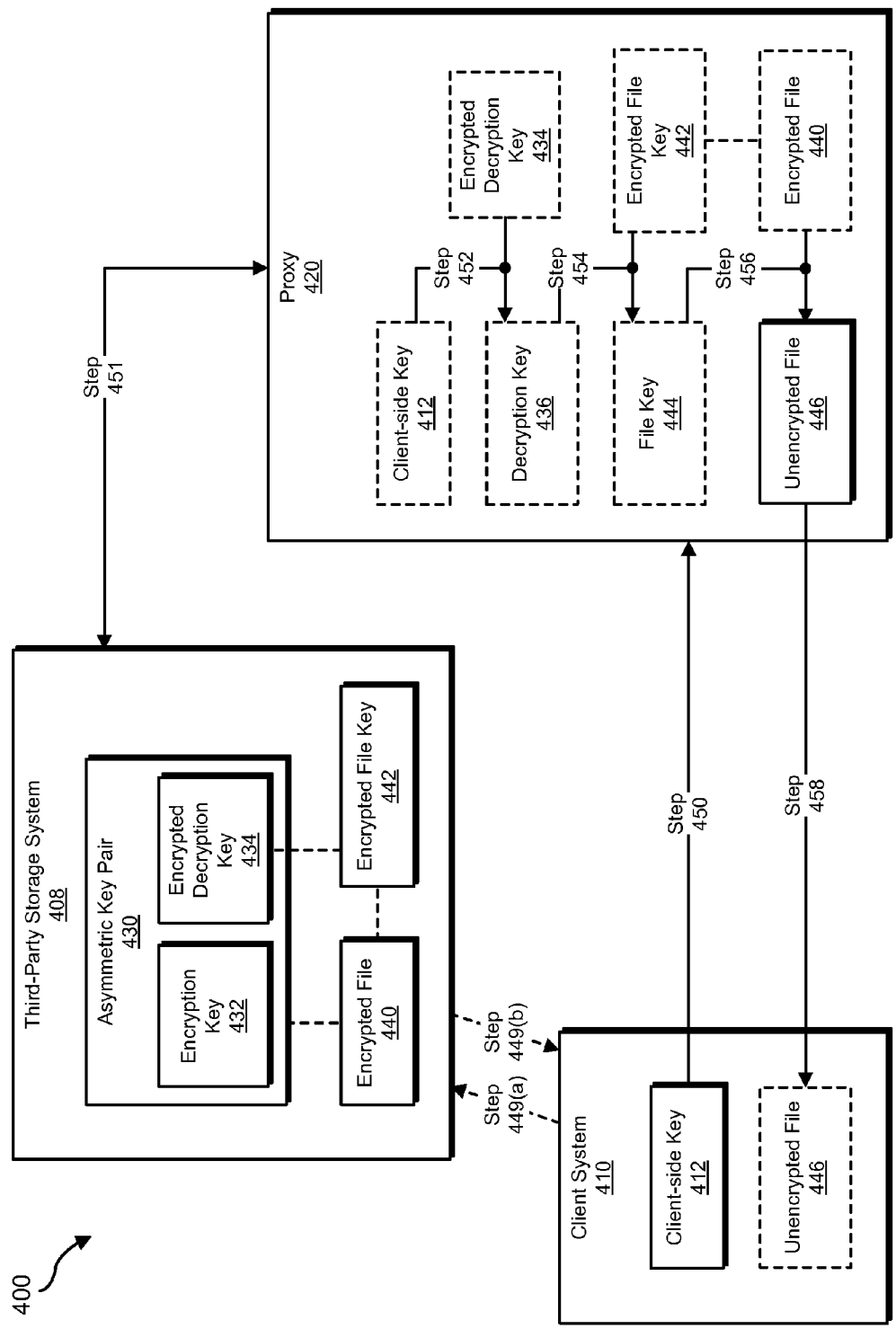
FIG. 4 is a block diagram of an exemplary computing system for secure hybrid third-party data storage.

To provide an example of the context in which identification module 104 may receive the user-initiated request, FIG. 4 illustrates an exemplary system 400 for secure hybrid third-party storage. As shown in FIG. 4, system 400 may include a client system 410, a third-party storage system 408, and a proxy 420. In one example, a user of client system 410 may wish to access an unencrypted version of an encrypted file 440 stored on third-party storage system (e.g., an unencrypted file 446). Accordingly, at step 450, client system 410 may send a request to proxy 420 to access unencrypted file 446. In some examples, client system 410 may first send a request to third-party storage system 408 to access unencrypted file 446 (e.g., at step 449(a)). In these examples, third-party storage system 408 may determine that access to unencrypted file 446 requires decrypting encrypted file 440 (e.g., through a process using a client-side key 412). Accordingly, at step 449(b), third-party storage system 408 may redirect client system 410 to proxy 420 (e.g., so that client system 410 sends the request to proxy 420).

Figure 5:
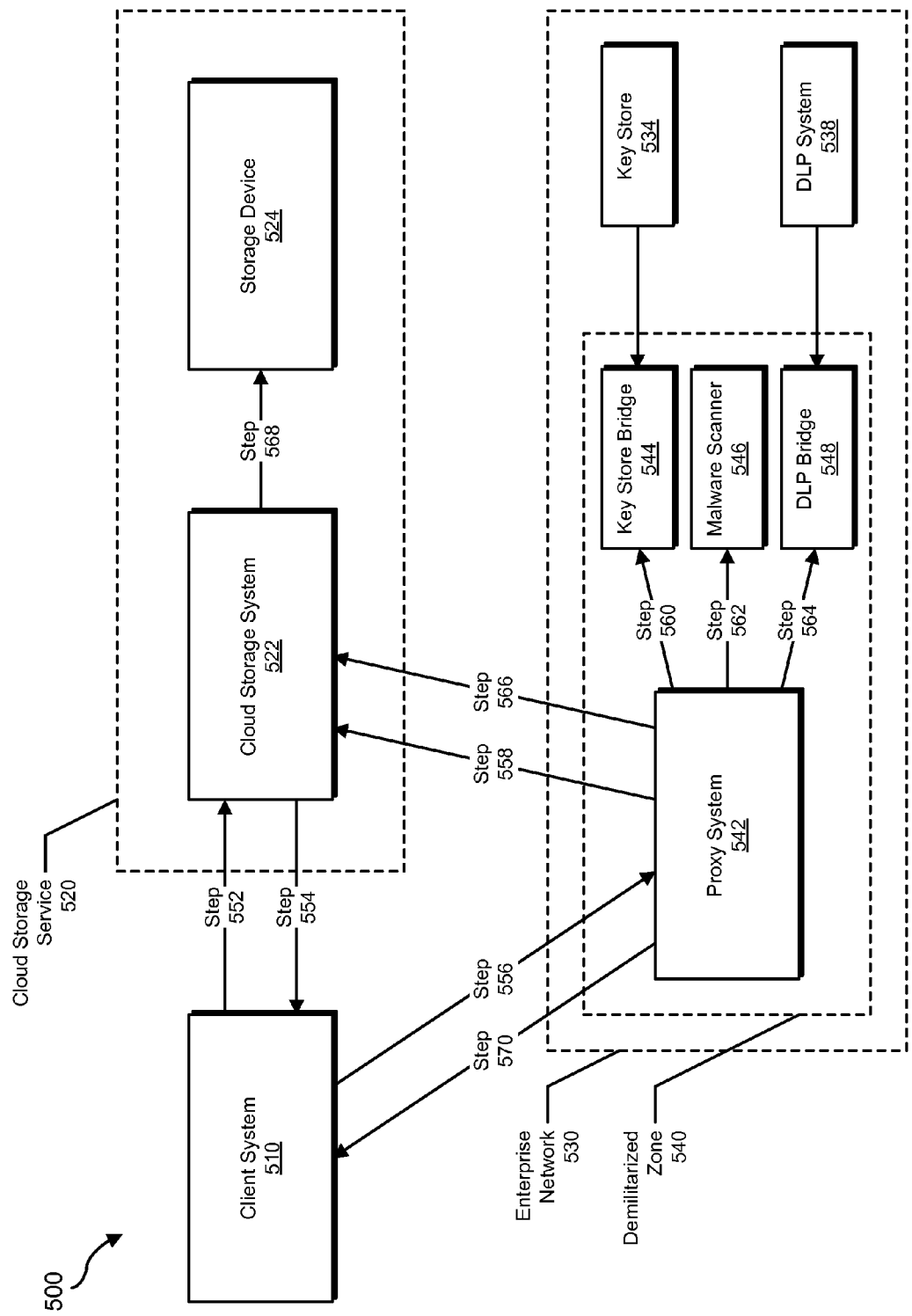
FIG. 5 is a block diagram of an exemplary computing system for secure hybrid third-party data storage.

To provide additional context, a user (e.g., a user of the client system) may have previously encrypted and uploaded to the third-party storage system via the trusted proxy system. FIG. 5 illustrates an exemplary system 500 for secure hybrid third-party storage. As shown in FIG. 5, system 500 may include a client system 510, a cloud storage service 520, an enterprise network 530, and a demilitarized zone 540 of enterprise network 530. Cloud storage system 520 may include a cloud storage system 522 and a storage device 524. Demilitarized zone 540 may include a proxy system 542. In addition, in some examples, demilitarized zone 540 may include a key store bridge 544 that communicates with a key store 534 in enterprise network 530, a malware scanner 546, and a data loss prevention (DLP) bridge 548 that communicates with a DLP system 538 in enterprise network 530. As used herein, the phrase "demilitarized zone" may refer to any computing system and/or network that may insulate a private and/or protected network from a public network (e.g., to reduce exposure to security vulnerabilities by preventing direct public access to sensitive resources on the private network).

Using FIG. 5 as an example, a user of client system 510 may instruct client system 510 to upload a file to cloud storage service 520 for secure storage. Accordingly, at step 552, client system 510 may send a request to cloud storage system 522 indicating to cloud storage system 522 that client system 510 is going to upload the file to cloud storage service 520. For example, client system 510 may send a POST request to cloud storage system 522 indicating to that cloud storage system 522 that client system 520 is going to upload the file to a specified folder. At step 554, cloud storage system 522 may determine that the request should be routed through a trusted proxy system (e.g., proxy system 542). For example, cloud storage system 522 may determine that the content of the file is sensitive (e.g., based on the folder to which the file is to be uploaded, based on the user account under which the request took place, or any other suitable criteria). Accordingly, at step 556, client system 510 may send the request to proxy system 542. In some examples, client system 510 may send the request directly to proxy system 542 from the outset or may only attempt to send metadata about the file to cloud storage system 522.

Continuing to step 558, proxy system 542 may request one or more encryption keys from cloud storage system 522 (e.g., an encryption key in an asymmetric key pair that pertains to a user account of cloud storage service 520 to which the file is to be uploaded). Proxy system 542 may also request a master client-side key. In some examples, proxy system 542 may request the master client-side key directly from client system 510. Additionally or alternatively, proxy system 542 may request the client-side key from key store 534 on enterprise network 530 (e.g., through key store bridge 544). In this example, client system 510 may have provided an authentication token to proxy system 542, key store bridge 544, and/or key store 534 to access the client-side key from key store 534. In some examples, proxy system 542 may also perform one or more scans on the file before encrypting the file. For example, at step 562, proxy system 542 may subject the file to malware scanner 546 for an anti-malware scan. At step 564, proxy system 542 may subject to the file to DLP system via DLP bridge 548 for a DLP scan. In this manner, policies pertaining to enterprise network 530 may be applied to the unencrypted file without exposing the policies to cloud storage service 520. After scanning the file, proxy system 542 may encrypt the file with the previously obtained encryption key. Additionally or alternatively, proxy system 542 may generate a file key for the file, encrypt the file with the file key, and encrypt the file key with the previously obtained encryption key. Proxy system 542 may then, at step 566, upload the encrypted file (and, e.g., the encrypted file key) to cloud storage system 522. At step 568, cloud storage system 522 may store the encrypted file on storage device 524. At step 570, proxy system 542 may indicate to client system 510 that the file has been securely stored.

As will be explained in greater detail below, the above-described steps may be reversed so that the file may be accessed, in unencrypted form, via proxy system 542 without cloud storage system 522 ever having access to the unencrypted file or unencrypted keys that would provide cloud storage system 522 with the ability to obtain access to the unencrypted file.

Returning to FIG. 3, at step 304 one or more of the systems described herein may retrieve, in response to the request, from the third-party storage system and for the trusted proxy system, (i) the encrypted file and (ii) a decryption key that has been encrypted with a client-side key, where an asymmetric key pair designated for the user account may include an encryption key and the encrypted decryption key. For example, at step 304 retrieving module 106 may, as part of computing device 202 in FIG. 2, retrieve, in response to the request, from third-party storage system 208 and for computing device 202, (i) encrypted file 242 and (ii) decryption key 226 that has been encrypted with client-side key 230. In this example, asymmetric key pair 220 (designated for user account 240) may include encryption key 222 and encrypted decryption key 224.

As used herein, the phrase "asymmetric key pair" may refer to any pair of cryptographic keys that includes both an encryption key (or "public key") and a decryption key (or "private key"). The encryption key may include any key that does not require secrecy in order to secure data encrypted with the key. For example, the encryption key may be used to encrypt data using an asymmetric key algorithm. Consequently, decrypting data encrypted with the encryption key may require the corresponding decryption key of the asymmetric key pair. In some examples, the asymmetric key pair may be stored on and/or by a third-party storage system. In at least one example, neither the encryption key nor the decryption key may be distributed outside the third-party storage system.

In addition, the phrase "client-side key," as used herein, may refer to any suitable cryptographic key or keys for encrypting and/or decrypting the decryption key of the asymmetric key pair. In some examples, the client-side key may include a symmetric key (e.g., a key usable for both encrypting data and decrypting said data). For example, the client-side key may be configured to encrypt and decrypt data according to an Advanced Encryption Standard specification (e.g., AES-256). In some examples, the client-side key may be generated on the client system. For example, the client-side key may be generated using a key derivation function, such as a password-based key derivation function (e.g., PBKDF2).

In some examples, the client-side key may be cached on the client system. Additionally or alternatively, the client-side key may be generated as needed from a password (e.g., generated either at the client system or at a trusted proxy system). In some examples, the client-side key may be retrieved from an external key store. For example, retrieving module 106 may, as a part of the trusted proxy system in a demilitarized zone of an enterprise network, retrieve the client-side key from a key store in the enterprise network. As will be explained in greater detail below, in some examples the client-side key may not be stored on the server-side computing device and/or within a third-party storage system implemented by the server-side computing device. In some examples, the client-side key may be accessible only by a corresponding client. This client may correspond to an organization, a group with shared secrets, a computing device, and/or any other suitable entity.

In some examples, as explained earlier, one or more of the systems described herein (e.g., the trusted proxy system) may have used the encryption key within the asymmetric key pair to encrypt the encrypted file. For example, one or more of the systems described herein may receive the unencrypted version of the encrypted file from the client system and then generate the encrypted file. These systems may generate the encrypted file by generating a file key based on at least one characteristic of the unencrypted version of the encrypted file and then encrypting the unencrypted version of the encrypted file with the file key. For example, these systems may derive a hash of the unencrypted version of the encrypted file and base the file key on the hash. In this manner, the systems and methods described herein may produce identical encrypted files from identical unencrypted files, allowing for deduplication across clients.

For example, the third-party storage system may deduplicate the encrypted file with an additional encrypted file that is encrypted with the file key. Upon generating the file key, the trusted proxy system may encrypt the file key with the encryption key. The term "deduplication," as used herein, may refer to one or more operations related to reducing the amount of storage space used in a single-instance data storage system, including operations for detecting and preventing data from being redundantly stored to the single-instance data storage system. Deduplication may be performed using any suitable deduplication technology or algorithm. In some examples, deduplication may include file-level deduplication. Additionally or alternatively, deduplication may include block-level deduplication.

In addition to encrypting the unencrypted version of the encrypted file, in some examples one or more of the systems described herein (e.g., the trusted proxy system) may perform one or more operations based on the unencrypted version of the encrypted file (e.g., before encrypting the unencrypted version of the encrypted file and thereby losing access to the unencrypted version of the encrypted file). For example, one or more of the systems described herein may index the contents of the unencrypted version of the encrypted file, perform a scan on the unencrypted version of the encrypted file (e.g., an anti-malware scan, a DLP scan, a scan for copyrighted content, etc.), generate a preview of the contents of the unencrypted version of the encrypted file, etc. In these examples, these systems may associate metadata generated from the unencrypted version of the encrypted file with the encrypted file once the encrypted file is encrypted.

In some examples, the trusted proxy system may upload some of the generated metadata to the third-party storage system. This may enable the third-party storage system to enhance future browsing and/or searching operations on stored data (e.g., without requiring that these operations be routed through the trusted proxy system). For example, a user operating the client system may browse through file listings directly via the third-party storage system. When the user attempts to access a file from the listing provided by the third-party storage system, the third-party storage system may redirect the client system to the trusted proxy system to access the file.

In some examples, uploading the generated metadata may enable the third-party storage system and/or to apply policies to stored data based on the metadata (e.g., deduplication policies, storage security policies, retention policies, etc.). In some examples, some of the metadata may be maintained by the trusted proxy system alone. In an additional example, the trusted proxy system may encrypt some of the metadata before uploading the metadata to the third-party storage system, such that the unencrypted metadata may only be accessed via the trusted proxy system. In some examples, the trusted proxy system may selectively upload unencrypted metadata to the third-party storage system, upload encrypted metadata to the third-party storage system, and/or retain metadata without uploading it to the third-party storage system based on the type and/or contents of the metadata. For example, the third-party storage system may determine that an unencrypted preview of a sensitive file is not to be uploaded to the third-party storage system. In some examples, some metadata may be encrypted using a scheme that allows the third-party storage system to directly decrypt and provide the metadata. For example, file paths and file names may be encrypted and stored by the third-party storage system and decrypted by the third-party storage system before being provided to the client system during browsing and/or searching operations.

Retrieving module 106 may identify the asymmetric key pair designated for the user account in any suitable manner. In some examples, a third-party storage system may host data for multiple user accounts, each with a designated and distinct asymmetric key pair. Accordingly, retrieving module 106 may retrieve the asymmetric key pair for the user account according to one or more identifiers and/or credentials provided by the client system and forwarded to the third-party storage system.

In some examples, retrieving module 106 may, as a part of the trusted proxy system, initiate and establish communication with the third-party storage system to retrieve the encrypted file and the encrypted decryption key. In this manner, the systems described herein may avoid security vulnerabilities that may otherwise be possible by allowing the third-party storage system to initiate communication with the trusted proxy system.

Returning to FIG. 3, at step 306 one or more of the systems described herein may receive, at the trusted proxy system, the client-side key. For example, at step 306 receiving module 108 may, as part of computing device 202 in FIG. 2, receive, at computing device 202, client-side key 230.

Receiving module 108 may receive the client-side key from any suitable source. For example, as noted earlier, receiving module 108 may receive the client-side key from a key store. For example, the client system may authenticate with the trusted proxy system and/or with a key store to which the trusted proxy system has access. The trusted proxy system may then thereby receive the client-side key from the key store. In some examples, receiving module 108 may receive the client-side key from the client system. For example, the client system may provide the client-side key to the trusted proxy system as a part of the request to access the encrypted file. Additionally or alternatively, the trusted proxy system may request the client-side key from the client system.

Receiving module 108 may receive the client-side key from the client system in any of a variety of ways. For example, receiving module 108 may receive the client-side key from the client system and/or key store directly. Additionally or alternatively, receiving module 108 may receive the client-side key from the client system and/or key store by receiving data representing the client-side key and from which the client-side key may be generated. For example, receiving module 108 may receive a password for a key derivation function from the client system and use this key derivation function to generate the client-side key from the password.

At step 308, one or more of the systems described herein may decrypt, at the trusted proxy system, the decryption key with the client-side key. For example, at step 308 decryption module 110 may, as part of computing device 202 in FIG. 2, decrypt, at computing device 202, decryption key 226 with client-side key 230.

Decryption module 110 may decrypt the decryption key in any suitable manner. For example, decryption module 110 may apply the client-side key to the decryption key according to a predetermined symmetric key algorithm to generate a decrypted version of the decryption key. By decrypting the decryption key at the trusted proxy system, the third-party storage system may have no access to the decrypted decryption key and, thus, no access to the unencrypted version of the encrypted file.

At step 310, one or more of the systems described herein may use the decryption key to access an unencrypted version of the encrypted file at the trusted proxy system. For example, at step 310 using module 112 may, as part of computing device 202 in FIG. 2, use decryption key 226 to access an unencrypted version of encrypted file 242 at computing device 202.

Access module 112 may access the unencrypted version of the encrypted file to any of a variety of ends. For example, as detailed above, the request from the client system may include a request to retrieve an unencrypted version of the encrypted file. Accordingly, access module 112 may transmit the unencrypted version of the encrypted file from the trusted proxy system to the client system (e.g., in response to the request).

FIG. 4 illustrates an exemplary system 400 for secure third-party data storage. As shown in FIG. 4, exemplary system 400 may include a client system 410 configured to store one or more files via a third-party storage service facilitated by third-party storage system 408. For example, client system 410 may have previously transmitted an unencrypted file 446 to a proxy 420. Proxy 420 may have identified an asymmetric key pair 430 associated with client system 410, retrieved an encryption key 432 of asymmetric key pair 430 (e.g., from third-party storage system 408 or client system 410), generated a file key (e.g., a file key 444) based on characteristics of unencrypted file 446, and encrypted unencrypted file 446 using file key 444 (e.g., resulting in an encrypted file 440). Proxy 420 may have then encrypted the file key with encryption key 432 (e.g., resulting in an encrypted file key 442) and provided encrypted file 440 and encrypted file key 442 to third-party storage system 408. In one example, client system 410 may attempt to retrieve unencrypted file 446, now stored on third-party storage server 420 as encrypted file 440. For example, at step 450 client system 410 may transmit a message to proxy 420 requesting unencrypted file 446 and including client-side key 412. Proxy 420 may accordingly retrieve client-side key 412.

At step 451, proxy 420 may retrieve encrypted decryption key 434, encrypted file 440, and encrypted file key 442 from third-party storage system 408. At step 452, proxy 420 may decrypt encrypted decryption key 434 with client-side key 412 to result in a decryption key 436. At step 454, proxy 420 may use decryption key 436 to decrypt encrypted file key 442 to obtain file key 444 for encrypted file 440. At step 456, proxy 420 may use file key 444 to decrypt encrypted file 440 and obtain unencrypted file 446. At step 458, proxy 420 may transmit unencrypted file 446 to client system 410, fulfilling the request by client system 410.

Returning to step 310 of FIG. 3, in some examples, access module 112 may access the unencrypted version of the encrypted file to generate metadata describing the unencrypted version of the encrypted file. In some examples, access module 112 may then store the metadata in relation to the encrypted file and/or upload the metadata to the third-party storage system so that the metadata describing the encrypted file remains available even after the unencrypted version of the encrypted file is not directly accessible on a third-party storage system. Additionally or alternatively, access module 112 may encrypt and then upload the metadata to the third-party storage system so that the metadata is not visible to the third-party storage system yet is not permanently stored on the proxy system.

For example, access module 112 may perform a security scan on the unencrypted version of the encrypted file (e.g., to determine whether the encrypted file includes any malware or poses any other security risk). Additionally or alternatively, access module 112 may perform a data loss prevention scan on the unencrypted version of the encrypted file (e.g., to apply data loss prevention policies on the encrypted file, including determining whether the encrypted file may be stored on the third-party storage system). In another example, access module 112 may index the unencrypted version of the encrypted file based on content within the unencrypted version of the encrypted file (e.g., to facilitate searching for the encrypted file based on its content without access to the unencrypted version of the encrypted file). In an additional example, access module 112 may generate a preview of the unencrypted version of the encrypted file based on content within the unencrypted version of the encrypted file (e.g., to facilitate browsing through encrypted files without access to the unencrypted versions of the encrypted files). As detailed above, in some examples one or more systems described herein may additionally or alternatively perform one or more of the operations described above when the unencrypted version of the encrypted file is first provided to the proxy system (e.g., before it is encrypted and uploaded to the third-party storage system).

In some examples, multiple parties (e.g., that use separate trusted proxy systems) may share the file on the third-party storage system, and each may wish to apply one or more policies requiring a scan to the unencrypted file. In these examples, access module 112 may identify a shared-access scanning policy that indicates whether a given element of a scanning policy will be applied to a file on the trusted proxy system, on a separate trusted proxy system controlled by another party, or on both trusted proxy systems.

In some examples, access module 112 may provide access to the unencrypted version of the encrypted file to another party. For example, access module 112 may provide access to the unencrypted version of the encrypted file to another user account. In this example, an additional asymmetric key pair may be designated for the additional user account, including an additional encryption key and an additional decryption key. The additional decryption key may be encrypted with an additional client-side key (pertaining, e.g., to an additional client system corresponding to the additional user account). In this example, access module 112 may provide access to the unencrypted version of the encrypted file to the additional user account by first identifying a file key used to encrypt the encrypted file. Since the encrypted file may pertain to the user account, the file key may be encrypted with the encryption key (i.e., the encryption key of the asymmetric key pair corresponding to the user account). Access module 112 may then decrypt the file key with the decryption key and encrypt a copy of the file key with the additional encryption key (and, e.g., upload the encrypted copy of the file key to the third-party storage system). In this manner, the additional user account may have access to the encrypted file (by, e.g., downloading the encrypted copy of the file key to the trusted proxy system or an additional trusted proxy system and submitting the additional client-side key to decrypt the file key, allowing for decryption of the encrypted file by the file key).

In some examples, access module 112 may provide access to the unencrypted version of the encrypted file based on a membership to a group of user accounts. For example, access module 112 may retrieve, from the third-party storage system, an additional asymmetric key pair designated for a group of user accounts that include the user account. The additional asymmetric key pair may include an additional encryption key and an additional decryption key. The additional decryption key may be encrypted with an encryption key that corresponds to the asymmetric key pair of the user account. Access module 112 may then decrypt the additional decryption key with the decryption key. Access module 112 may further identify a file key used to encrypt the encrypted file. The file key may be encrypted with the additional encryption key. Accordingly, access module 112 may decrypt the file key with the additional decryption key and decrypt the encrypted file with the file key. In an additional example, the encrypted file may be encrypted with the additional encryption key instead of a file key. In this example, access module 112 may simply decrypt the encrypted file with the additional decryption key.

In some examples, access module 112 may provide access to an unencrypted version of the file directly to a designated party to share the file (e.g., instead of sharing the file via the third-party storage system by providing alternate encryptions of decryption keys to the third-party storage system for access by other parties with the capacity to decrypt the alternate encryptions).

As explained above, by maintaining asymmetric key pairs for encrypting and decrypting secured data (e.g., files and/or encryption keys for files) on a third-party storage server and encrypting the decryption keys of these asymmetric key pairs with encryption keys maintained by clients, the systems and methods described herein may allow a trusted proxy system to the third-party storage server to encrypt data submitted by clients to the third-party storage server as needed but require clients to submit a decryption key in order to access secured data. These systems and methods may thereby prevent an attacker who has gained access to a third-party storage system from accessing the secured data in an unencrypted state (or, e.g., a key that may be used to access the secured data in an unencrypted state), while still allowing and/or facilitating the sharing, deduplication, analysis, and/or indexing of this secured data. In some examples, these systems and methods may also enable enterprises to apply scanning policies to the secured data without revealing the potentially sensitive contents of the scanning policies to the third-party storage server.

Figure 6:
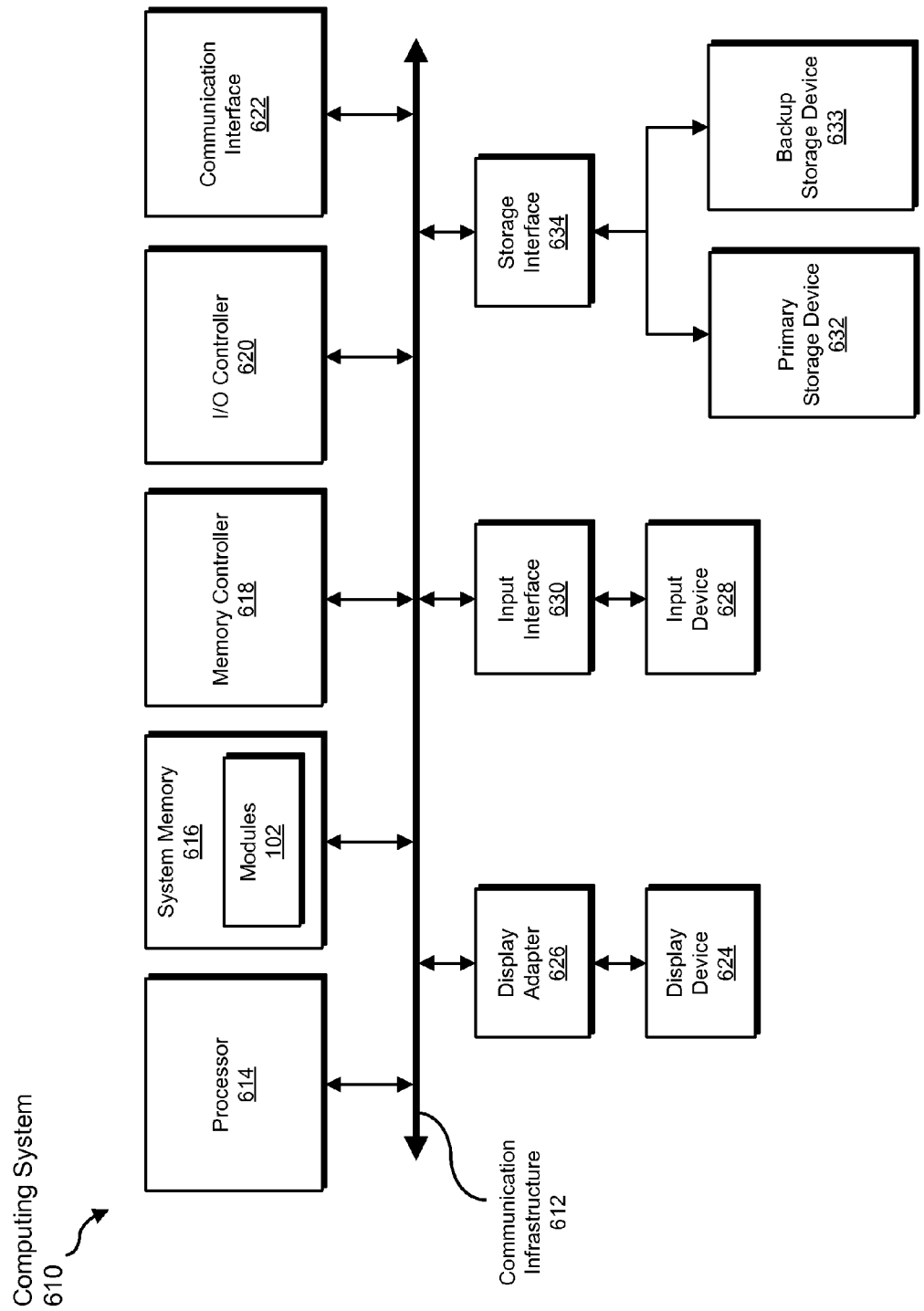
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630.

Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
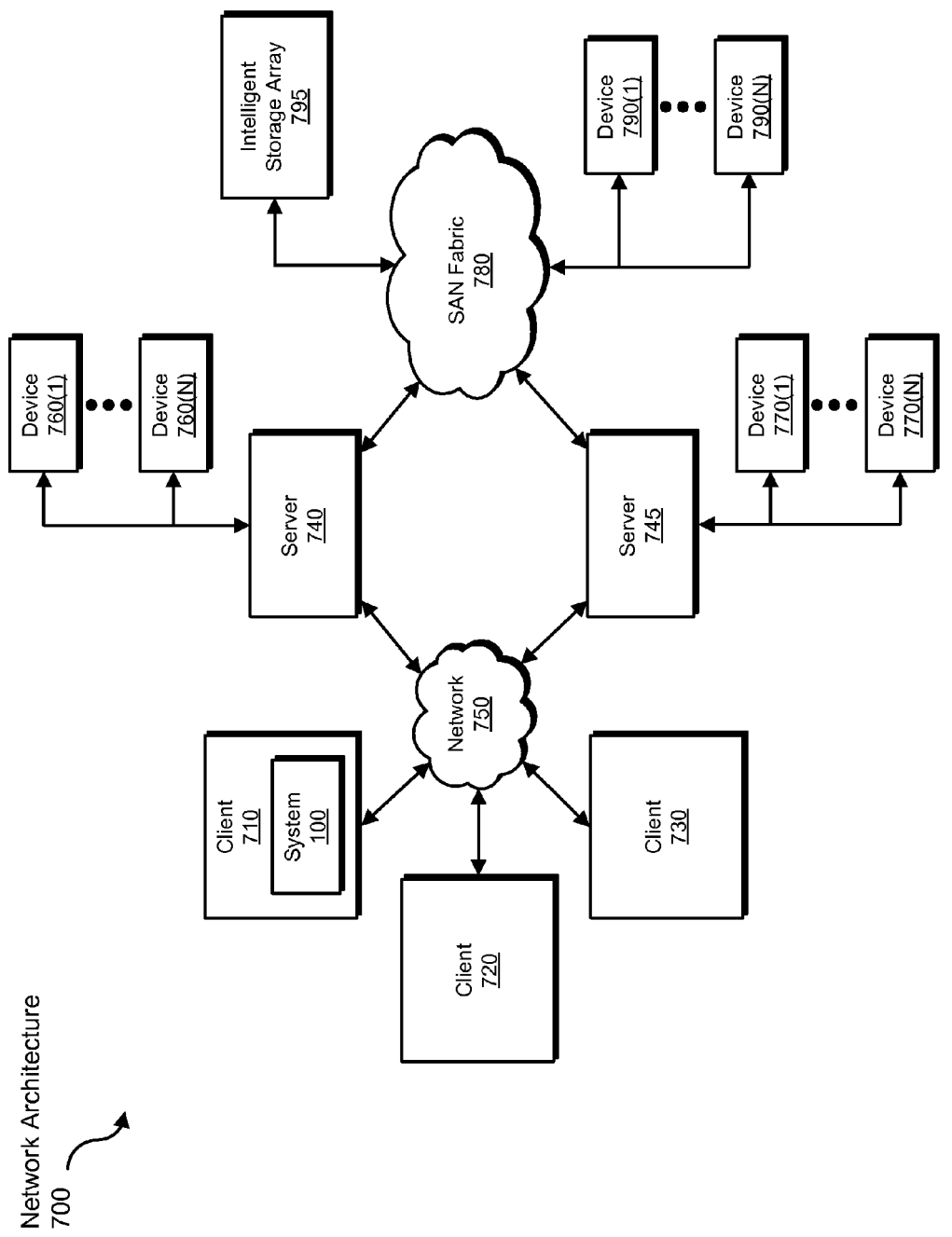
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790

(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for secure hybrid third-party data storage.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more modules recited herein may receive an encrypted file to be transformed, transform the encrypted file, output the result of the transformation to a storage device, use the result of the transformation to scan an unencrypted version of the file, and store the result of the transformation to a client system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for secure hybrid third-party data storage, at least a portion of the method being performed by a computing device comprising at least one processor, the method comprising:
    identifying, at a trusted proxy system, an access request from a client system to access an encrypted file stored under a user account at a third-party storage system, wherein the requested access requires decryption of the encrypted file, wherein the trusted proxy system is owned by an owner of the encrypted file and the third-party storage system is not owned by the owner of the encrypted file;
    retrieving, in response to the request, from the third-party storage system and for the trusted proxy system:
        the encrypted file;
        a decryption key that has been encrypted with a client-side key, wherein an asymmetric key pair designated for the user account comprises an encryption key and the encrypted decryption key;
    receiving, at the trusted proxy system, the client-side key, without exposing the client-side key to the third-party storage system;
    decrypting the encrypted decryption key with the client-side key at the trusted proxy system rather than at the third-party storage system responsive to the trusted proxy system being owned by the owner of the encrypted file and the third-party storage system not being owned by the owner of the encrypted file;
    using the decryption key to access an unencrypted version of the encrypted file at the trusted proxy system.

2. The computer-implemented method of claim 1, wherein the trusted proxy system is administrated by an owner of the encrypted file and the third-party storage system is not administrated by the owner of the encrypted file.

3. The computer-implemented method of claim 1, wherein accessing the encrypted file comprises transmitting the unencrypted version of the encrypted file to the client system.

4. The computer-implemented method of claim 1, wherein using the decryption key to access the unencrypted version of the encrypted file comprises:
    generating, at the trusted proxy system, metadata describing the unencrypted version of the encrypted file;
    providing the metadata to at least one of the client system and the third-party storage system.

5. The computer-implemented method of claim 4, wherein generating the metadata describing the unencrypted version of the encrypted file comprises at least one of:
    performing a scan on the unencrypted version of the encrypted file at the trusted proxy system;
    creating, at the trusted proxy system, an index entry of the unencrypted version of the encrypted file based on content within the unencrypted version of the encrypted file;
    generating, at the trusted proxy system, a preview of the unencrypted version of the encrypted file based on content within the unencrypted version of the encrypted file.

6. The computer-implemented method of claim 1, wherein accessing the encrypted file comprises:
    identifying, at the trusted proxy system, a policy for scanning the unencrypted version of the encrypted file;
    scanning, at the trusted proxy system, the unencrypted version of the encrypted file based on the policy.

7. The computer-implemented method of claim 1, wherein using the decryption key to access the encrypted file comprises:
    retrieving, from the third-party storage system and for the trusted proxy system, a file key used to encrypt the encrypted file, wherein the file key is encrypted with the encryption key;
    decrypting, at the trusted proxy system, the file key with the decryption key;
    decrypting, at the trusted proxy system, the encrypted file with the file key.

8. The computer-implemented method of claim 1, wherein:
    accessing the encrypted file comprises providing access to the unencrypted version of the encrypted file to an additional user account;
    an additional asymmetric key pair is designated for the additional user account, the asymmetric key pair comprising an additional encryption key and an additional decryption key that has been encrypted with an additional client-side key.

9. The computer-implemented method of claim 8, wherein providing access to the unencrypted version of the encrypted file to the additional user account comprises:
retrieving, from the third-party storage system and for the trusted proxy system, the additional encryption key and a file key used to encrypt the encrypted file, wherein the file key is encrypted with the encryption key;
decrypting, at the trusted proxy system, the file key with the decryption key;
encrypting, at the trusted proxy system, a copy of the file key with the additional encryption key;
transmitting the encrypted copy of the file key from the trusted proxy system to the third-party storage system.

10. The computer-implemented method of claim 1, further comprising:
receiving, at the trusted proxy system, the unencrypted version of the encrypted file from the client system;
generating the encrypted file at the trusted proxy system by:
generating a file key based on at least one characteristic of the unencrypted version of the encrypted file;
encrypting the unencrypted version of the encrypted file with the file key;
encrypting the file key with the encryption key;
transmitting the encrypted file and the encrypted file key to the third-party storage system.

11. The computer-implemented method of claim 10, further comprising deduplicating the encrypted file with an additional encrypted file that is encrypted with the file key.

12. The computer-implemented method of claim 1, wherein the third-party storage system lacks access to:
the unencrypted version of the encrypted file;
an unencrypted version of the decryption key;
the client-side key.

13. The computer-implemented method of claim 1, wherein using the decryption key to access the unencrypted version of the encrypted file comprises:
retrieving, from the third-party storage system and for the trusted proxy system, an additional asymmetric key pair designated for a plurality of user accounts comprising the user account, the additional asymmetric key pair comprising an additional encryption key and an additional decryption key that has been encrypted with the encryption key;
decrypting, at the trusted proxy system, the encrypted additional decryption key with the decryption key;
retrieving, from the third-party storage system and for the trusted proxy system, a file key used to encrypt the encrypted file, wherein the file key is encrypted with the additional encryption key;
decrypting, at the trusted proxy system, the file key with the additional decryption key;
decrypting, at the trusted proxy system, the encrypted file with the file key.

14. A system for secure hybrid third-party data storage, the system comprising:
an identification module, stored in memory, that identifies, at a trusted proxy system, an access request from a client system to access an encrypted file stored under a user account at a third-party storage system, wherein the requested access requires decryption of the encrypted file, wherein the trusted proxy system is owned by an owner of the encrypted file and the third-party storage system is not owned by the owner of the encrypted file;
a retrieving module, stored in memory, that retrieves, in response to the request, from the third-party storage system and for the trusted proxy system:
the encrypted file;
a decryption key that has been encrypted with a client-side key, wherein an asymmetric key pair designated for the user account by an encryption key and the encrypted decryption key;
a receiving module, stored in memory, that receives, at the trusted proxy system, the client-side key, without exposing the client-side key to the third-party storage system;
a decryption module, stored in memory, that decrypts the encrypted decryption key with the client-side key at the trusted proxy system rather than at the third-party storage system responsive to the trusted proxy system being owned by the owner of the encrypted file and the third-party storage system not being owned by the owner of the encrypted file;
a using module, stored in memory, that uses the decryption key to access an unencrypted version of the encrypted file at the trusted proxy system;
at least one physical processor configured to execute the identification module, the retrieving module, the receiving module, the decryption module, and the using module.

15. The system of claim 14, wherein the trusted proxy system is administrated by an owner of the encrypted file and the third-party storage system is not administrated by the owner of the encrypted file.

16. The system of claim 14, wherein the using module accesses the encrypted file by transmitting the unencrypted version of the encrypted file to the client system.

17. The system of claim 14, wherein the using module uses the decryption key to access the unencrypted version of the encrypted file by:
generating, at the trusted proxy system, metadata describing the unencrypted version of the encrypted file;
providing the metadata to at least one of the client system and the third-party storage system.

18. The system of claim 17, wherein the using module generates the metadata describing the unencrypted version of the encrypted file by at least one of:
performing a scan on the unencrypted version of the encrypted file at the trusted proxy system;
creating, at the trusted proxy system, an index entry of the unencrypted version of the encrypted file based on content within the unencrypted version of the encrypted file;
generating, at the trusted proxy system, a preview of the unencrypted version of the encrypted file based on content within the unencrypted version of the encrypted file.

19. The system of claim 14, wherein the using module accesses the encrypted file by:
identifying, at the trusted proxy system, a policy for scanning the unencrypted version of the encrypted file;
scanning, at the trusted proxy system, the unencrypted version of the encrypted file based on the policy.

20. A non-transitory computer-readable medium comprising one or more computer-readable instructions that, when executed by at least one processor of a computing device, cause the computing device to:
identify, at a trusted proxy system, an access request from a client system to access an encrypted file stored under a user account at a third-party storage system, wherein the requested access requires decryption of the encrypted file, wherein the trusted proxy system is owned by an owner of the encrypted file and the third-party storage system is not owned by the owner of the encrypted file;

retrieve, in response to the request, from the third-party storage system and for the trusted proxy system:

the encrypted file;

a decryption key that has been encrypted with a client-side key, wherein an asymmetric key pair designated for the user account comprises an encryption key and the encrypted decryption key;

receive, at the trusted proxy system, the client-side key, without exposing the client-side key to the third-party storage system;

decrypt the encrypted decryption key with the client-side key at the trusted proxy system rather than at the third-party storage system responsive to the trusted proxy system being owned by the owner of the encrypted file and the third-party storage system not being owned by the owner of the encrypted file;

use the decryption key to access an unencrypted version of the encrypted file at the trusted proxy system.

* * * * *